US006094908A

United States Patent [19]
Baudu et al.

[11] Patent Number: 6,094,908
[45] Date of Patent: Aug. 1, 2000

[54] SYNCHRONIZING CONTROL SYSTEM FOR AIRCRAFT JET ENGINE THRUST REVERSERS

[75] Inventors: Pierre André Marcel Baudu, Le Havre; Patrick Gonidec, Montivilliers; Pascal Gérard Rouyer, Saint Aubin Routot; Guy Bernard Vauchel, Le Havre, all of France

[73] Assignee: Societe Hispano-Suiza Aerostructures, France

[21] Appl. No.: 09/034,140

[22] Filed: Feb. 23, 1998

[30]   Foreign Application Priority Data

Feb. 27, 1997 [FR] France ................... 97.02329

[51] Int. Cl.[7] ....................................... F02K 3/02
[52] U.S. Cl. ........................ 60/226.2; 244/110 B
[58] Field of Search .................... 60/226.2, 230, 60/39.091; 239/265.31; 299/110 B

[56]   References Cited

U.S. PATENT DOCUMENTS

| | | |
|---|---|---|
| 3,500,646 | 3/1970 | Hom et al. . |
| 3,605,411 | 9/1971 | Maison et al. . |
| 3,612,209 | 10/1971 | Vdoviak et al. ............. 181/33 HC |
| 3,724,759 | 4/1973 | Ellis . |
| 4,458,582 | 7/1984 | Linton . |
| 5,548,954 | 8/1996 | de Cambray et al. . |
| 5,953,904 | 9/1999 | Mountney ..................... 60/226.2 |
| 5,956,939 | 9/1999 | Fage ............................. 60/226.2 |

FOREIGN PATENT DOCUMENTS

| | | |
|---|---|---|
| 1482538 | 5/1967 | France . |
| 2030034 | 10/1970 | France . |
| 2 712 929 | 6/1995 | France . |
| 33 37 868 A1 | 5/1984 | Germany . |
| WO 86/00862 | 2/1986 | WIPO . |

OTHER PUBLICATIONS

Luftfahrttechnik Raumfahrttechnik 15 (1969) Nr. Dec 12 "Schubumkehr bei Bläsertriebwerken".

*Primary Examiner*—Timothy S. Thorpe
*Assistant Examiner*—Ehud Gartenberg
*Attorney, Agent, or Firm*—Bacon & Thomas PLLC

[57]   ABSTRACT

A thrust reverser is disclosed for a high bypass ratio turbofan jet engine having a cowling with an inner surface forming an outer boundary of a gas flow duct, the cowling having a plurality of lateral openings and a plurality of thrust reverser doors connected to the cowling so as to be movable between forward thrust positions and reverse thrust positions. The thrust reverser also includes a plurality of linear actuators, one linear actuator connected to the cowling and to each thrust reverser door so as to move the thrust reverser doors between their forward and reverse thrust positions. A synchronization system is included in the thrust reverser and interconnects two of the plurality of linear actuators, the synchronization system having an electric motor, a plurality of transmission drive links, each transmission drive link having one end connected to one of the two linear actuators and a second end, and a gear drive mechanism connecting the output of the electric motor to the second ends of the transmission drive links. Operation of the electric motor rotates the transmission drive links to operate the respective linear actuators to move the thrust reverser doors between their forward and reverse thrust positions. The gear drive mechanism and the connections between the transmission drive links and the linear actuators are such that, in the absence of rotation of the transmission drive links, operation of the linear actuators is prohibited, thereby locking the thrust reverser doors in their forward thrust positions.

20 Claims, 4 Drawing Sheets

SYNCHRONIZING CONTROL SYSTEM FOR AIRCRAFT JET ENGINE THRUST REVERSERS

BACKGROUND OF THE INVENTION

The present invention relates to a synchronizing control system for a thrust reverser of an aircraft turbojet engine, more particularly, such a synchronizing control system mechanically interconnecting at least two thrust reverser doors.

Turbofan-type turbojet engines are well known in the art and typically comprise a fan at the front of the turbojet engine which directs a flow of bypass air through a duct bounded by the engine cowling on the inside and a fan cowling on the outside. The generally annular duct bounded by the engine cowling and the fan cowling may channel both the bypass flow and the primary exhaust gas flow at a downstream portion from the turbojet engine, or may channel only the bypass flow.

In aircraft on which the turbojet engine is mounted outside of the airframe structure, the fan cowling and the engine cowling are configured to form boundaries of the bypass flow duct and to provide aerodynamic outer surfaces to reduce drag.

FIGS. 1 and 2 illustrate a known pivoting door-type thrust reverser associated with the cowling of a turbofan-type turbojet engine. As illustrated in FIG. 1, the upstream portion of the cowling which defines the outer limits of the bypass flow duct and which is generally concentrically arranged about the turbojet engine (not shown) is designated as 1 and generally comprises an external cowling panel and an internal cowling panel interconnected by a frame 6. The outer surface of the external cowling panel has an aerodynamic surface over which the air external to the engine passes during aircraft flight. The inner surface of the inner cowling panel defines the outer boundary of the bypass flow duct 15 through which the bypass flow air passes in the direction of the arrow.

The cowling also comprises a thrust reverser, illustrated generally at 2, and a downstream cowling portion 3. The thrust reverser 2 comprises a door 7 pivotally attached to the cowling so as to pivot about transverse axis 17 such that it is movable between a closed, forward thrust position, illustrated in FIG. 1, and an open, reverse thrust position in which the forward end (towards the left as viewed in FIG. 1) of the thrust reverser door 7 is moved outwardly from the cowling, while a rear portion is moved inwardly into the bypass flow duct airstream so as to redirect at least a portion of the bypass flow through an opening in the cowling in a direction that has a reverse thrust component.

An actuator 8 for moving the door 7 between its forward thrust and reverse thrust positions may comprise a cylinder extending through and mounted to the frame 6, and having an extendable and retractable piston rod connected to the thrust reverser door 7.

The thrust reverser door 7 has an outer door panel 9 and an inner door panel 11 joined together by an internal structure. The forward end of the door 7 may have a deflector to maximize the efficiency of the thrust reverser when the door 7 is in the reverse thrust position. When the door is in the forward thrust position, as illustrated in FIG. 1, the outer door panel 9 is substantially flush with the external surfaces of the upstream panel and the downstream cowling portion 3. The inner face 11 tapers toward the outer surface 9 at the forward end of the door 7, forming a cavity when in the forward thrust position.

As illustrated in FIG. 2, a plurality of thrust reverser doors 7 may be incorporated into the cowling, such doors being circumferentially spaced around the periphery of the cowling. A longitudinal beam portion 18 extends axially between forward part 4 and the rear part 3 of the cowling between adjacent thrust reverser doors 7 to provide structural rigidity to the cowling and to provide pivot mounting points for attaching the doors 7 to the cowling. U.S. Pat. No. 3,605, 411, and French Patents 1,482,538 and 2,030,034 illustrate typical, known thrust reversers.

It is known to utilize one linear actuator per thrust reverser door affixed to the cowling and the thrust reverser door to move the door between the forward and reverse thrust positions, as illustrated in the aforementioned French Patent 1,482,538.

Conventionally, the thrust reverser control system has a hydraulic power source and generally consists of a common control unit, one linear actuator per movable element, position signalling means, and several redundant locks to preclude unintentional movement of the thrust reverser doors toward the reverse thrust positions. The redundant locks typically comprise a plurality of mechanical locking systems to provide three lines of defense against inadvertent deployment of the thrust reverser doors. A primary latch latches the forward portion of the thrust reverser doors to the cowling so as to retain the doors in their forward thrust positions. Secondary locks may be integrated into the thrust reverser door actuators. The secondary latch retains the thrust reverser doors or movable elements in their forward thrust positions should the primary latch malfunction. Typically, the secondary lock may comprise claws within the linear actuator to grip various portions of the linear actuator to prevent the actuator from moving to its reverse thrust position. The claws may remain withdrawn, or in an idle position, during normal operation of the system, and only function when there is a malfunction of the primary lock. Since the secondary lock is located within the linear actuator body, it is impossible to inspect the secondary lock for any malfunctions. Thus, in the absence of such inspections, the secondary lock may malfunction when called into play.

A third lock may be actuated by a power source different from that of the primary and secondary locks. The third lock may be located in side portions of the thrust reverser doors and, similar to the secondary locks, may be passive during normal operation of the thrust reverser. The third locks typically do not physically touch the latch and the movable element when the thrust reverser is in the forward thrust configuration.

The known locking systems require parts having very small tolerances and which are, therefore, costly to manufacture. At the same time, the total number of movable parts degrades the overall reliability of the locking systems. Operating all of the system elements requires a specific hydraulic connection for each component, thereby increasing the number of connections and the amount of hydraulic piping necessary. Since hydraulic fluid is notoriously corrosive and flammable, the number of connections increases the probability that a leak will occur and requires increased maintenance to maintain the integrity of the hydraulic system.

SUMMARY OF THE INVENTION

A thrust reverser is disclosed for a high bypass ratio turbofan jet engine having a cowling with an inner surface forming an outer boundary of a gas flow duct, the cowling having a plurality of lateral openings and a plurality of thrust reverser doors connected to the cowling so as to be movable between forward thrust positions, wherein each of the plurality of thrust reverser doors covers one of the plurality of lateral openings, and reverse thrust positions, in which each of the plurality of thrust reverser doors opens the associated lateral opening enabling gases in the gas flow duct to pass through the lateral openings. The thrust reverser also includes a plurality of linear actuators, one linear actuator connected to the cowling and to each thrust reverser door so as to move the thrust reverser doors between their forward and reverse thrust positions. A synchronization system is included in the thrust reverser and interconnects two of the plurality of linear actuators, the synchronization system having an electric motor, a plurality of transmission drive links, each transmission drive link having one end connected to one of the two linear actuators and a second end, and a gear drive mechanism connecting the output of the electric motor to the second ends of the transmission drive links. Operation of the electric motor rotates the transmission drive links to operate the respective linear actuators to move the thrust reverser doors between their forward and reverse thrust positions. The gear drive mechanism and the connections between the transmission drive links and the linear actuators are such that, in the absence of rotation of the transmission drive links, operation of the linear actuators is prohibited, thereby locking the thrust reverser doors in their forward thrust positions.

The synchronization control system according to the present invention is used in place of one of the known locking devices, particularly the secondary locking device, to improve reliability and preclude the inherent danger of an undetected malfunction of the known systems. The present system minimizes the number of parts, thereby inherently increasing the reliability of the system and avoids the drawbacks of the known systems, particularly those utilizing a hydraulic power source.

By interconnecting at least two of the thrust reverser doors with the synchronization system, should the locking systems on one of the doors fail, its deployment into the reverse thrust position will be prohibited since the doors to which it is mechanically connected are locked, and by the fact that the electric motor is not operating, thereby preventing rotation of the transmission drive link connected to the unlatched door.

DETAILED DESCRIPTION OF THE PREFERRED EMBODIMENTS

Figure 1:
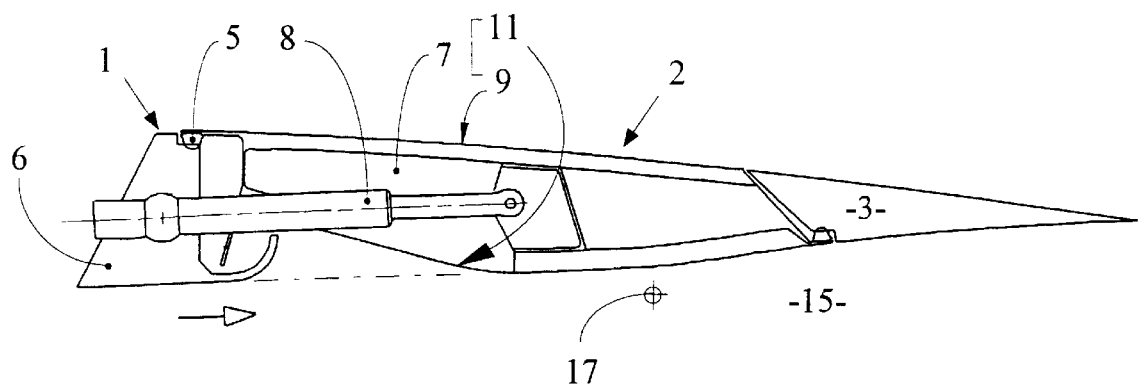
FIG. 1 is a partial, cross-sectional view of a known type of thrust reverser.
Figure 2:
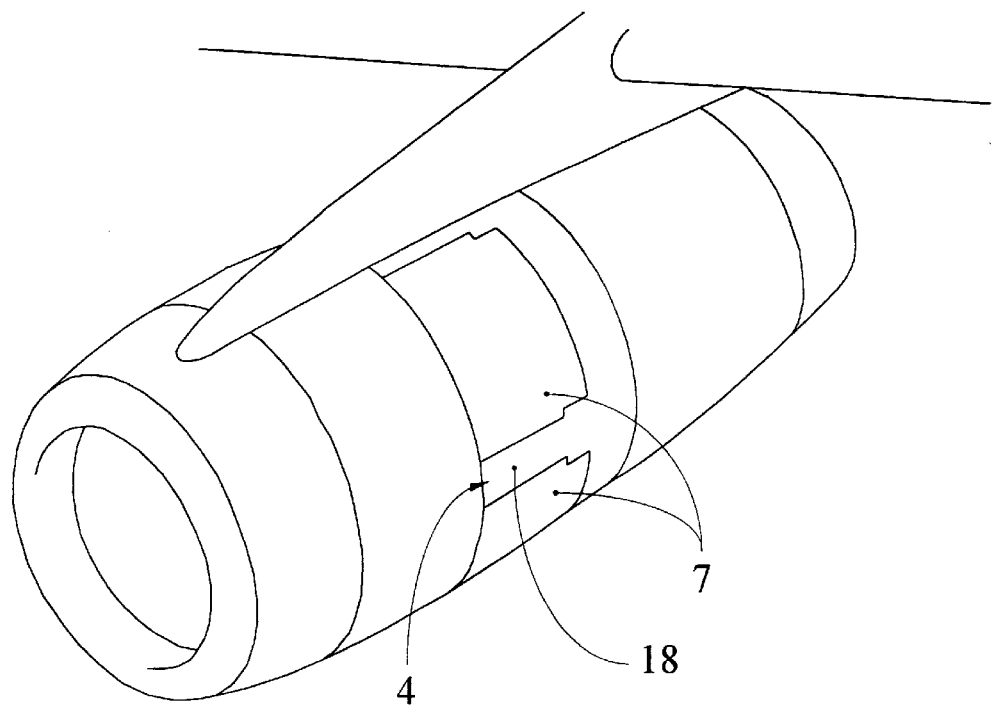
FIG. 2 is a perspective view of cowling incorporating the thrust reverser of FIG. 1.
Figure 3:
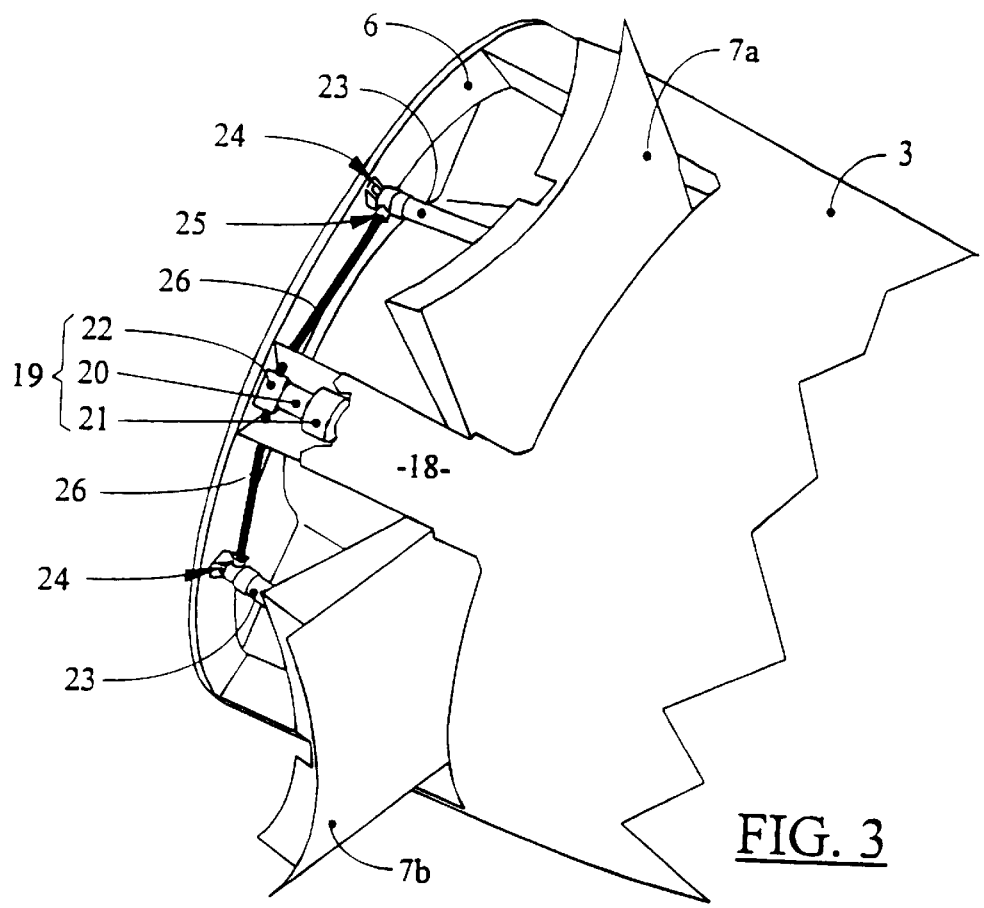
FIG. 3 is a partial, perspective view of the synchronization control system according to the present invention.
Figure 7:
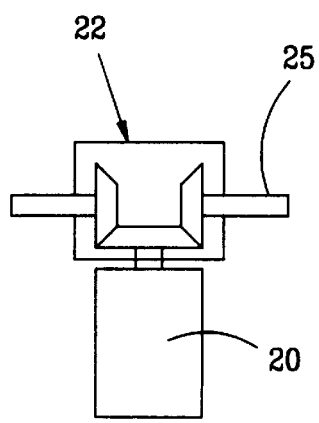
FIG. 7 is a schematic view illustrating the connection between the transmission drive links and the electric motor according to the present invention.

As best illustrated in FIG. 3, an electric motor 20 is mounted in the longitudinal beam portion 18 of the cowling with the operation of the electric motor being controlled by electronic control unit 21 which, in turn, may be connected to the electronic control system of the aircraft (FADEC). The output of the electric motor 20 drives a gear within the gear drive mechanism 22. The output shaft of electric motor 20 may be connected directly to a bevel gear, as illustrated in FIG. 7, or may be connected to a known gear system to adjust the speed of the output elements of the gear drive mechanism 22 to a desired level. The drive assembly 19, comprising the electric motor 20, the electronic control 21 and the gear drive mechanism 22, is rigidly affixed to the longitudinal beam portion 18 and, in the embodiment illustrated in FIG. 3, is located rearwardly of the front frame 6. If necessary, an access hatch may be provided on the external surface of the cowling to facilitate maintenance of this assembly.

Mechanical door actuators 23 are pivotally attached to the front frame at one end by a bracket 24, the door actuators 23 having an extendable and retractable rod connected to one of the thrust reverser doors, 7a, or 7b. The actuators 23 comprise known mechanical actuators and a detailed discussion of the internal components of these known elements is not believed to be necessary. To facilitate maintenance of the thrust reverser, each mechanical actuator 23 may incorporate a known disengaging means to make possible individual movement of each door.

Figure 8:
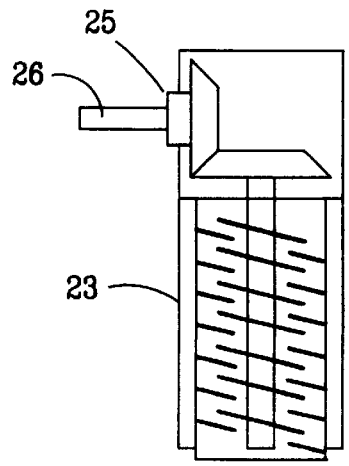
FIG. 8 is a schematic diagram illustrating the connection between the transmission drive links and the linear actuator according to the present invention.

A transmission drive link 26 connects the gear drive mechanism 22 to the two actuators 23. As can be seen in FIGS. 3, 7 and 8, one end of each of the transmission drive links 26 is connected to a gear of the gear drive mechanism 22, while the opposite end of the transmission drive link 26 is connected to a gear which, in turn, drives the mechanical door actuator 23. The drive gear is joined to the second end of the transmission drive links 26 by joint 25. This joint may comprise any known type of connection whereby the rotation of transmission drive link 26 causes rotation of the associated gear.

The transmission drive links 26 may comprise a flexible drive cable and, when the joint 25 is not aligned with the pivot axis of the attachment of the actuator 23 to the bracket 24, will compensate for the angular slack or clearances when the thrust reverser door is being moved between its forward and reverse thrust positions. If the joint 25 is coincident with the pivot axis of the connection of the actuator 23 with the bracket 24, the joint 25 may comprise a spline connection between the gear and the end of the transmission drive link 26.

Alternately, transmission drive links 26 may comprise rigid shafts. The rigid shaft may be utilized even if the connection 25 is not aligned with the pivot axis of the connection between the actuator 23 and the bracket 24. The angular displacement of the actuator 23 is slight during the operation of the thrust reverser doors, and the distance between the pivot axis and the joint 25 is sufficiently small such that the resulting movement of the transmission drive link 26 can be absorbed by enabling the assembly 19 to follow the angular displacement of the transmission drive link. The discussion of the aforementioned drive and link connections is not intended to be exclusive, and any known system may be incorporated into the present invention. Thrust reverser having doors with cut-off or angled edges can also partially or completely house the assembly 19, or a portion thereof, in one of the upper or lower portions of the stationary structure of the cowling.

Figure 4:
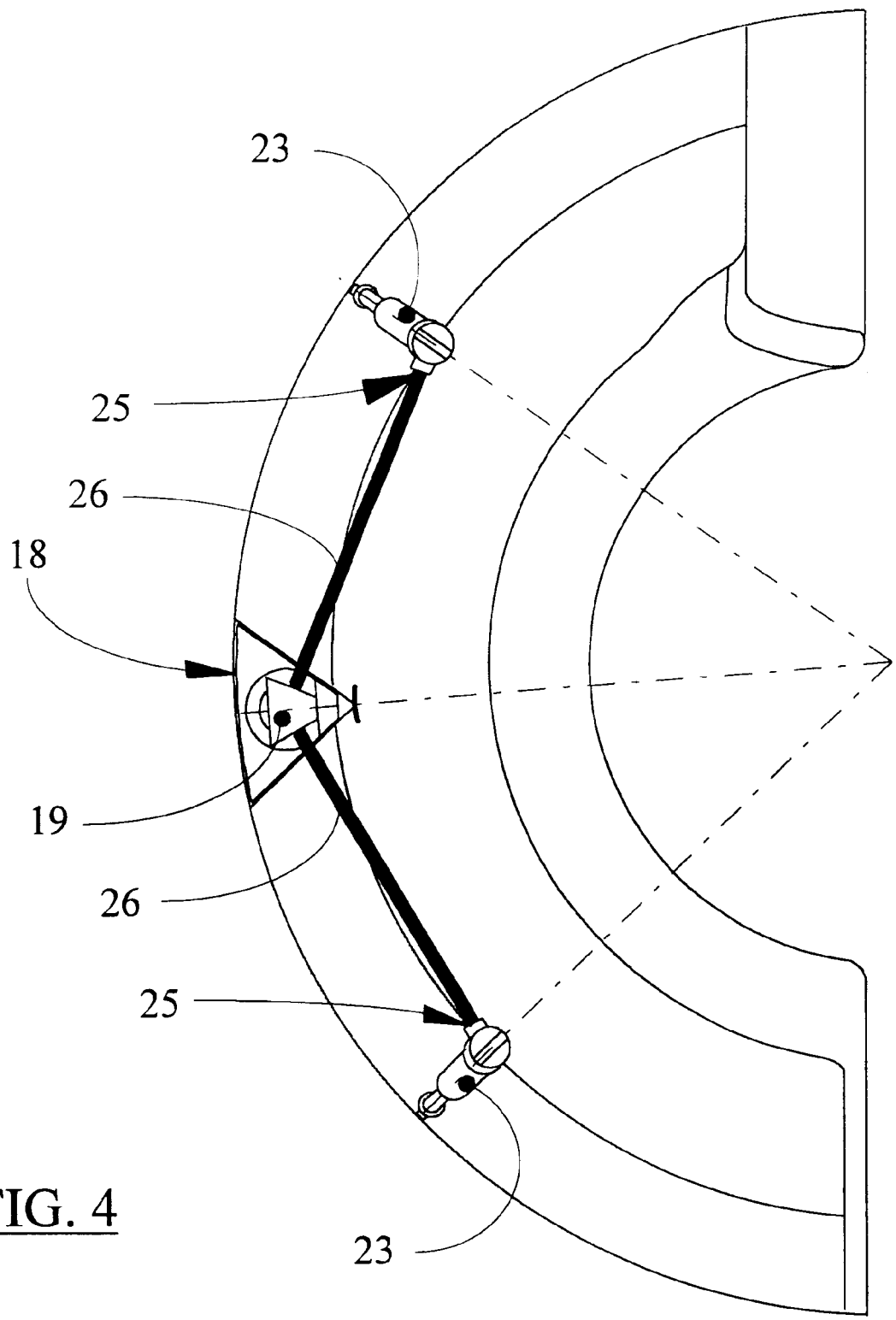
FIG. 4 is a partial, cross-sectional view taken transversely through the cowling of FIG. 3 to the rear of and looking forwardly toward the front frame.

As illustrated in FIG. 4, the synchronization control system closely links the actuation of both doors 7a and 7b. Operation of the motor 20 causes rotation of the two transmission drive links 26 which, in turn, causes operation of the two actuators 23. In the event that a latch for one of the doors 7a, or 7b malfunctions, the synchronization control system precludes this door from undesired opening due to the mechanical connection of this door with the second door in which the latches are fully functional. Even considering accumulated tolerances of the mechanical synchronization control system, the unlatched thrust reverser door is kept sealed in the forward thrust position to minimize aerodynamic losses. The use of the present synchronization control systems enables the elimination of the known secondary locking devices which are, in general, located within the linear actuator. The present invention improves the reliability of the thrust reverser by eliminating the problem of undetectable malfunctions relating to the known secondary locking devices within the linear actuator body.

Although, in FIG. 3, the linear actuators 23 are illustrated as being generally aligned with the longitudinal central axis of each of the thrust reverser doors 7a and 7b, the linear actuators 23 may alternatively be positioned adjacent to the opposite sides of the longitudinal beam portion 18 and can be connected directly to the output of the gear drive mechanism 22. This configuration allows further reduction of the number of components, thereby inherently improving the reliability and weight savings of the thrust reverser.

Figure 5:
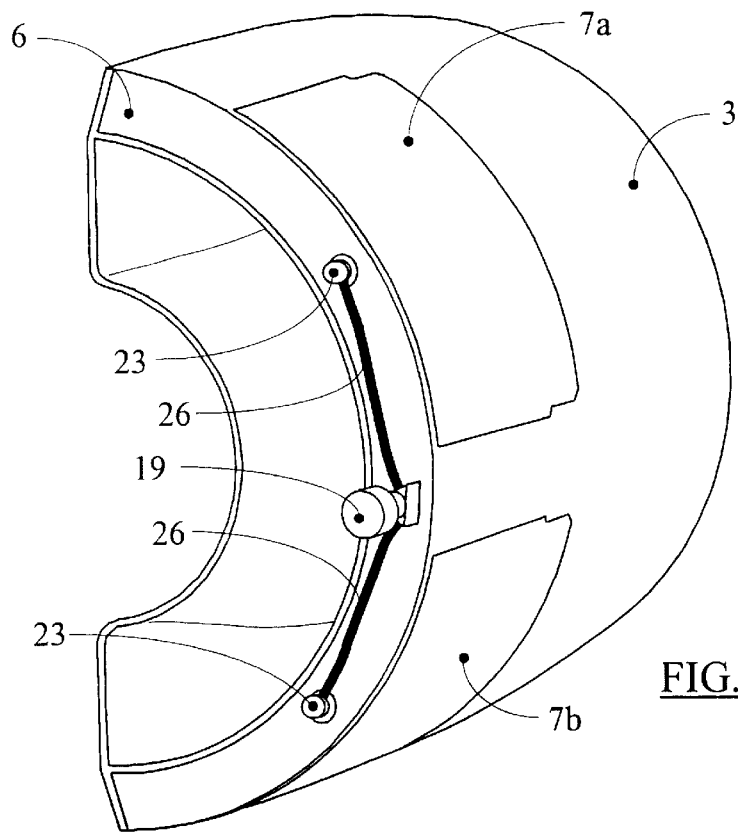
FIG. 5 is a partial, perspective view of an alternative construction of the synchronization control system according to the present invention.

FIG. 5 illustrates an alternative construction of the synchronization control system according to the present invention in which the assembly 19 is located forwardly of the front frame 26, as are the transmission drive links 26. In this configuration, the linear actuators 23 extend through the front frame 26 and are connected to ends of the associated transmission drive links 26. The assembly 19 may be affixed directly to the front frame 6, or may be mounted on other structure of the cowling 1 and pass through the front frame 6. The synchronization system according to the present invention is also applicable to a thrust reverser in which the door is driven from its rear porion, as illustrated in French Patent 2,712,929.

The synchronization control system according to the present invention is applicable to thrust reversers having two or more thrust reverser doors. It can also be applied to cascade-type thrust reversers, or thrust reversers having downstream baffles in combination with linear actuators driving the thrust reverser movable elements.

Figure 6:
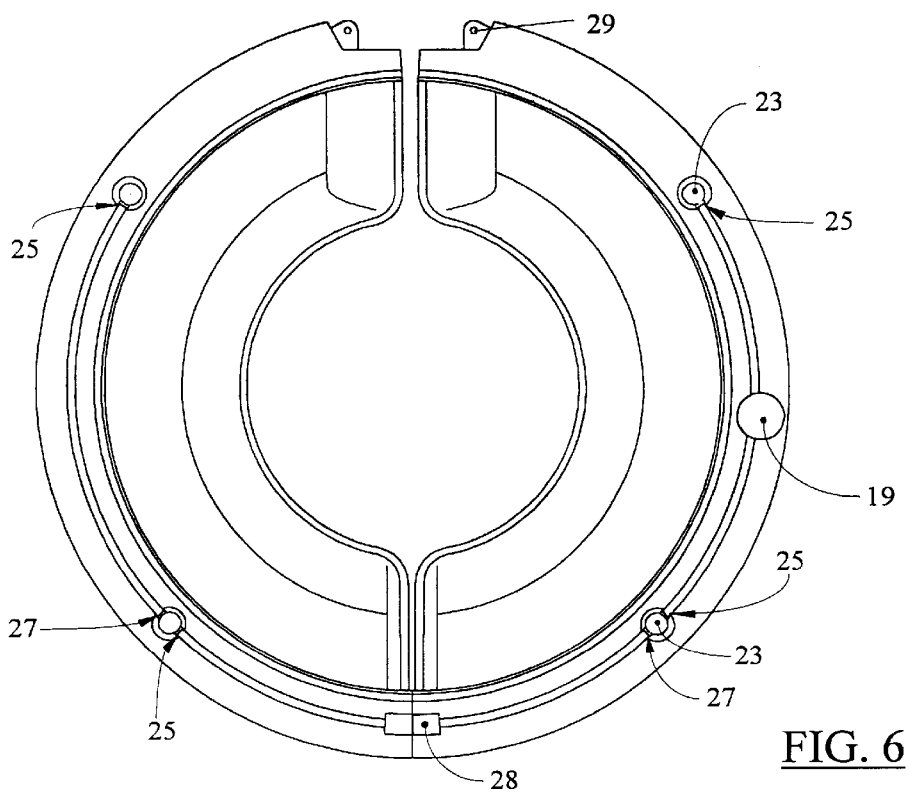
FIG. 6 is a front view of an alternative construction of the synchronization control system according to the present invention.

A single drive assembly 19 may be used to control more than two reverser doors, as illustrated in FIG. 6. In this construction, at least one of the two actuators 23 connected to the drive assembly 19 has an exit joint 27 connected to an additional transmission drive link 26 which is, in turn, connected to another actuator 23 at its opposite end by the gear end joint 25. Such assemblies can be utilized to interconnect all of the actuators 23 to a single drive assembly 19.

Aircraft engine cowlings may, in known fashion, be divided longitudinally into left and right halves to facilitate access and maintenance to the various engine components. To facilitate the opening of either or both of the halves, the transmission drive link 26 passing across the juncture of the cowling halves may have a releasable connector 28 located at or adjacent to the juncture. By releasing the connector 28, either one or both of the cowling halves may be moved upwardly about its pivot 29 connected to the engine mounting strut (not shown).

Alternatively, the drive assembly 19 can be situated within the longitudinal beam portion near the twelve o'clock position, when viewing the engine from the front. In this location, the motor is then protected by the longitudinal beam portion and by the aircraft engine mounting strut from damage due to a broken rotor disk.

The foregoing description is provided for illustrative purposes only and should not be construed as in any way limited this invention, the scope of which is defined solely by the appended claims.

We claim:

1. A thrust reverser for a high bypass ratio turbofan jet engine having a cowling with an inner surface forming an outer boundary of a gas flow duct, the cowling having at least two lateral openings therethrough, the thrust reverser comprising:
   a) at least two thrust reverser doors connected to the cowling so as to be movable between forward thrust positions, wherein each of the thrust reverser doors covers an associated one of the lateral openings, and reverse thrust positions, wherein each of the thrust reverser doors opens the associated lateral opening enabling gases in the gas flow duct pass through the lateral openings;
   b) at least two linear actuators, each linear actuator being connected to the cowling and to each thrust reverser door, the linear actuators moving the thrust reverser doors between the forward and reverse thrust positions; and,
   c) a synchronization system interconnecting at least two of the linear actuators, the synchronization system comprising:
      i) an electric motor having an output;
      ii) at least two transmission drive links, each transmission drive link having one end connected to one of the at least two linear actuators interconnected by the synchronization system and a second end, whereby rotation of the transmission drive links operates the respective linear actuators to move the thrust reverser doors between the forward and reverse thrust positions; and,
      iii) a gear drive mechanism connecting the output of the electric motor to the second ends of the transmission drive links whereby operation of the electric motor rotates the transmission drive links and whereby independent movement of the thrust reverser doors interconnected by the synchronization system is prevented.

2. The thrust reverser of claim 1 wherein the transmission drive links comprise rigid shafts.

3. The thrust reverser of claim 1 wherein the cowling has a longitudinal beam portion between adjacent lateral openings and wherein the linear actuators are located adjacent to opposite sides of the longitudinal beam portion.

4. The thrust reverser of claim 1 wherein the cowling includes a front frame located forwardly of the plurality of lateral openings and wherein the synchronization systems is located rearwardly of the front frame.

5. The thrust reverser of claim 1, further comprising:

a) a third linear actuator connected to the cowling and to a third thrust reverse door; and, b) a third transmission drive link having one end connected to the third linear actuator and a second end connected to one of the other linear actuators such that independent movement of the third thrust reverser door is prevented absent movement of the other thrust reverser doors.

6. The thrust reverser of claim 5, further comprising:

a releasable connector interposed between the first and second ends of the transmission drive link of an intermediate one of the thrust reverser doors, wherein the intermediate one of the thrust reverser doors is composed of two parts and the releasable connector is located at an interface of the two parts.

7. The thrust reverser of claim 5, wherein each of the linear actuators comprises a bevel-gear entry joint and wherein each intermediate one of the linear actuators further comprises a bevel-gear exit joint, the bevel gear joints connecting the transmission drive links to the linear actuators.

8. The thrust reverser according to claim 1, wherein each of the linear actuators is devoid of any internal locking mechanism.

9. The thrust reverser according to claim 1, further comprising:

a releasable connector interposed between the first and second ends of one of the transmission drive links.

10. A thrust reverser for a high bypass ratio turbofan jet engine having a cowling with an inner surface forming an outer boundary of a gas flow duct, the cowling having at least two lateral openings therethrough, the thrust reverser comprising:

a) at least two thrust reverser doors connected to the cowling so as to be movable between forward thrust positions, wherein each of the thrust reverser doors covers an associated one of the lateral openings, and reverse thrust positions, wherein each of the thrust reverser doors opens the associated lateral opening enabling gases in the gas flow duct pass through the lateral openings;

b) at least two linear actuators, each linear actuator being connected to the cowling and to each thrust reverser door, the linear actuators moving the thrust reverser doors between the forward and reverse thrust positions; and, c) a synchronization system interconnecting at least two of the linear actuators, the synchronization system comprising:

i) an electric motor having an output;

ii) at least two transmission drive links, each transmission drive link having one end connected to one of the at least two linear actuators interconnected by the synchronization system and a second end, whereby rotation of the transmission drive links operates the respective linear actuators to move the thrust reverser doors between the forward and reverse thrust positions; and, iii) a gear drive mechanism connecting the output of the electric motor to the second end of at least one of the transmission drive links, the second end of the other transmission drive links being connected to another one of the linear actuators, whereby operation of the electric motor rotates the transmission drive links and whereby independent movement of the thrust reverser doors interconnected by the synchronization system is prevented.

11. The thrust reverser of claim 10, wherein the transmission drive links comprise rigid shafts.

12. The thrust reverser of claim 10, wherein the cowling includes a front frame located forwardly of the plurality of lateral openings and wherein the synchronization systems is located rearwardly of the front frame.

13. The thrust reverser according to claim 10 wherein each of the linear actuators is devoid of any internal locking mechanism.

14. The thrust reverser according to claim 10, further comprising:

a releasable connector interposed between the first and second ends of one of the transmission drive links.

15. The thrust reverser of claim 10, further comprising:

a) a third linear actuator connected to the cowling and to a third thrust reverse door; and, b) a third transmission drive link having one end connected to the third linear actuator and a second end connected to one of the other linear actuators such that independent movement of the third thrust reverser door is prevented absent movement of the other thrust reverser doors.

16. The thrust reverser of claim 15, further comprising:

a releasable connector interposed between the first and second ends of the transmission drive link of an intermediate one of the thrust reverser doors, wherein the intermediate one of the thrust reverser doors is composed of two parts and the releasable connector is located at an interface of the two parts.

17. The thrust reverser of claim 15, wherein each of the linear actuators comprises a bevel-gear entry joint and wherein each intermediate one of the linear actuators further comprises a bevel-gear exit joint, the bevel gear joints connecting the transmission drive links to the linear actuators.

18. A thrust reverser for a high bypass ratio turbofan jet engine having a cowling with an inner surface forming an outer boundary of a gas flow duct, the cowling having at least three lateral openings therethrough with longitudinal beam portions located between adjacent lateral openings and a front frame located forwardly of the lateral openings, the thrust reverser comprising:

a) at least three thrust reverser doors connected to the cowling so as to be movable between forward thrust positions, wherein each of the thrust reverser doors covers an associated one of the lateral openings, and reverse thrust positions, wherein each of the thrust reverser doors opens the associated one of the lateral openings enabling gases in the gas flow duct pass through the lateral openings;

b) at least three linear actuators, each of the linear actuators being connected to the cowling and to a respective one of the thrust reverser doors, the linear actuators being located adjacent to the longitudinal beam portions, the linear actuators moving the thrust reverser doors between the forward and reverse thrust positions;

c) a synchronization system interconnecting the linear actuators, the synchronization system being located rearwardly of the front frame of the cowling, the synchronization system comprising:

i) an electric motor having an output;

ii) at least three transmission drive links, each transmission drive link having one end connected to a respective one of the linear actuators and a second end, whereby rotation of the transmission drive links operates the respective linear actuators to move the respective thrust reverser doors between the forward and reverse thrust positions; and, iii) a gear drive mechanism connecting the output of the electric motor to the second end of at least one of the transmission drive links whereby operation of the electric motor rotates the transmission drive links and whereby independent movement of the thrust reverser doors interconnected by the synchronization system is prevented; and, d) a releasable connector interposed between the first and second ends of at least one of the transmission drive links.

19. The thrust reverser of claim 18, wherein the transmission drive links comprise flexible cables.

20. The thrust reverser of claim 18, wherein the transmission drive links comprise rigid shafts.

* * * * *